June 9, 1942.  J. T. LITTLETON ET AL  2,285,595
TEMPERING GLASS
Filed Sept. 12, 1939

Annealed

Ordinary Temper

High Ratio

INVENTORS.
JESSE T. LITTLETON
HOWARD R. LILLIE
AND WILLIAM W. SHAVER
BY
ATTORNEY.

Patented June 9, 1942

2,285,595

UNITED STATES PATENT OFFICE 2,285,595

TEMPERING GLASS

Jesse T. Littleton, Howard R. Lillie, and William W. Shaver, Corning, N. Y., assignors to Corning Glass Works, Corning, N. Y., a corporation of New York Application September 12, 1939, Serial No. 294,540

8 Claims. (Cl. 49—89)

This invention relates to tempering glass and more particularly to the control of the degree of compression in the surface layers of a glass body.

The compressive strength of glass is known to be much greater than its tensile strength and, consequently, in endeavoring to produce stronger glass, efforts have been directed toward introducing compression areas into glass articles. As a result, tempering of glass was practiced as early as 1874 by De La Bastie and others.

So far as we are aware there has been no effort on the part of prior experimenters to govern the degree of compression in the surface layers of a glass article and prior art has wholly neglected the tension factor which must accompany and balance the zone of compression in every article into which compression is introduced.

The principal object of this invention is to produce a glass article having permanently set within its body a modified condition of strain such that its surface layers are in compression and its center is in tension, the ratio of compression to tension being relatively high.

A further object of the invention is a glass article having its surface layers in compression and its central layers in tension, a considerable number of the central layers in tension being substantially uniformly stressed.

In accomplishing this, consideration must be given to the "softening point," "annealing point," and "strain point" of the particular glass subjected to the tempering.

"Softening point," as used herein, is that condition in which glass has a viscosity of $10^{7.6}$ poises; "annealing point" is that condition in which glass has a viscosity of $10^{13.4}$ poises; and "strain point" is that condition in which glass has a viscosity of $10^{14.6}$ poises. We also use the expressions "softening temperature," "annealing temperature," and "strain temperature" as defining the temperature at which any annealed glass attains the viscous conditions above recited.

The above and other objects may be accomplished by so reducing the viscosity of a glass article throughout its mass that it lies below $10^{13.4}$ poises and preferably near $10^{7.6}$ poises, subjecting the article to a sudden short stiffening treatment by which its surface layers only attain rigidity and then subjecting the article to a treatment by which its interior portions attain rigidity at a greatly reduced rate. This may be accomplished by heating the article throughout its mass to a temperature lying between the annealing and softening temperatures of the glass from which the article is made, subjecting the article for a short period of time to a relatively severe chilling medium held at a temperature low enough to cause the surface layers of glass to become set, but above that which would cause them to break or check, then immediately subjecting the article to a temperature lying well above the lower temperature but below the strain temperature of the glass from which it is made for a somewhat longer period of time until all portions of the article achieve this temperature and subsequently allowing the article to cool in air.

The degree of temper obtained under specific chilling conditions is controlled primarily by the thermal expansion coefficient of the glass from which an article is made, though the thermal conductivity, the thickness of the glass, and its shape are also factors of somewhat lesser importance. The higher the expansion coefficient of the glass, the greater will be the degree of temper of the article and the lower the expansion coefficient the less will be the degree of temper for a like treatment.

Figure 1:
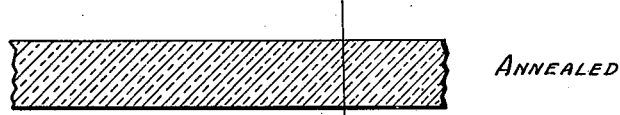
Fig. 1 is a sectional view through a piece of annealed glass showing diagrammatically the line of zero stress on opposite sides of which any stress in the glass should appear.
Figure 2:
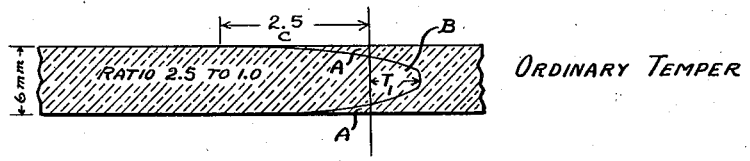
Fig. 2 is a view similar to Fig. 1 showing diagrammatically the distribution of stress on opposite sides of the line of zero stress in a piece of glass tempered by the methods heretofore employed.
Figure 3:
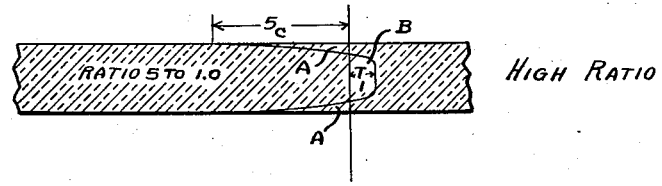
Fig. 3 is a view similar to Figs. 1 and 2 illustrating diagrammatically the distribution of stress on opposite sides of the line of zero stress in a piece of glass which has been tempered in accordance with the method of this invention by which a very high degree of compression can be introduced into the surface and a high ratio "square" or "rectangular" strain pattern produced.

Theory teaches that the higher the degree of compression in the surface layers of an article of glass, the higher will be its resistance to breakage, and, therefore, for a given degree of maximum tension in the glass, the greater the ratio of compression to tension the stronger will be the glass. Since the magnitude of the area A is a measure of the compressive forces in one-half of the glass, it must be equal to the area B which is a measure of the tension forces in one-half the glass under tension (Fig. 2), and the only way that a high ratio of compression to tension can be obtained is to lengthen the area A at the sacrifice of its depth. By the same reasoning, to decrease maximum tension in an article, the tension area B must be shortened and broadened so that the stress pattern obtained will be generally of the character shown in Fig. 3 in which the maximum compressive stress is about five times the maximum tensile stress thus producing a five to one ratio, and the area A representing again the total compressive force is equal to the area B representing the total tensile force of one-half of the glass section.

It has been quite definitely determined that the final strain pattern set in a glass article is determined by the temperature gradient existing in the various layers as they set up; i. e., pass thru that range of viscosity beyond which further molecular adjustment within the glass is impossible. Thus to achieve the strain pattern here desired, it is essential that the article be subjected to an extremely severe initial chill which will not only establish an extreme temperature gradient in the surface layers, but will set up these layers against further viscous flow and strain release. While a severe initial chill is essential it must be discontinued immediately upon setting up the desired surface conditions and replaced by a milder chilling action which is so controlled and proportioned to the thermal conductivity and capacity of the glass that a considerable portion of the central layers are set up under conditions of comparatively low and generally decreasing temperature gradient. This second chill need be continued only so long as is required to set up the entire article and bring it below its strain temperature after which the article may be cooled to room temperature rapidly or slowly as desired.

In actual practice it has been found that the difficulty attending the establishment of high ratio patterns increases as the thickness of the glass decreases. This is due to the relatively low coefficient of thermal conductivity of glass which decreases the effectiveness of the chilling medium as the thickness of glass through which it operates increases and results in a relatively hot central section in a thicker section and a relatively low temperature gradient therein on cooling even tho the surface layers are subjected to a very severe chilling action. Accordingly applicants' illustrations of their invention are largely in terms of the more difficult thinner sections, altho typical treatments of thicker sections are also given. These cover a number of representative glasses of varying composition and physical characteristics as follows:

*Table I*

|  | A | B | C | D | E | F |
|---|---|---|---|---|---|---|
| SiO₂ | 81.0 | 73.0 | 60.6 | 64.5 | 73 | 73 |
| B₂O₃ | 13.0 | 16.5 | 28.8 | 22.5 | 1 | |
| Al₂O₃ | 1.7 | | 2.5 | 5.0 | 1 | 1.5 |
| Na₂O | 4.4 | 4.25 | 8.1 | 8.0 | 16 | 16.5 |
| CaO | | | | | 5.5 | 5.5 |
| PbO | | 6.25 | | | | |
| MgO | | | | | 3.5 | 3.5 |
| Softening temp. | 813 | 756 | 703 | 715 | 697 | 696 |
| Annealing temp. | 550 | 526 | 496 | 480 | 517 | 510 |
| Strain temp. | 503 | 494 | 461 | 445 | 483 | 475 |
| Coef. of expan. | 32 | 36 | 46 | 48 | 94 | 92 |

Glass "A" above is shown as composition B₁ of the Sullivan and Taylor Patent No. 1,304,623, while glass "B" is of the type shown in Kraus Patent No. 1,508,455. Glasses E and F are typical soda lime glasses of substantially the same composition.

A wide variety of procedures may be followed to produce square strain patterns. The glassware may be heated in liquid baths of suitable composition or in air so long as the entire article is raised to a temperature near to its softening temperature. The initial chill may be effected either by subjecting the article to a spray of finely divided liquid cooling medium or by immersing the article momentarily in a liquid bath. Obviously the more severe the chilling action of the medium and the lower its temperature the shorter will be the time of initial chill. However, in order to produce the desired strain pattern the initial chilling medium must be sufficiently severe to set up the surface layers in a period of a few seconds since otherwise the temperature gradient within these layers at the time they set up will not be sufficiently high. As a general rule the maximum duration of the initial chill is roughly proportional to the thickness of the glass and amounts to not over five seconds for each one-fourth inch of thickness. The initial chilling medium is generally used at a temperature at least 100° C. below the strain temperature of the glass being processed and lower temperatures are often preferable. In general a spray action is more severe than simple immersion in the same liquid at the same temperature and accordingly shorter times may be employed.

The second chilling of the article may advantageously be performed in a molten salt bath since such baths are particularly adapted to maintain the surface of the glass article at a uniform, relatively high temperature while their high heat capacity will aid in lowering the article to their temperature. The nitrate and nitrite salts of sodium and potassium are commonly used for this purpose. In general it has been found desirable to maintain this bath temperature near, but somewhat below, the strain temperature of the glass being processed, a difference in the neighborhood of 50° C. usually being satisfactory. Thin ware will attain the temperature of the bath in from twenty to thirty seconds, but since additional treatment at this temperature has no appreciable effect the second chill is usually maintained for a period of about one minute in ware of ten millimeter thickness or less.

While the maximum values of compression and tension which will be obtained in practicing the process above outlined will vary somewhat with the thickness and composition of the glass and the exact treatment accorded it, it will be found that all of the strain patterns so produced will have the common characteristic of a compression to tension ratio of 3.25 or greater, while the tension part of the pattern will be characterized by a relatively wide zone of substantially uniform stress in the center of the section. Articles stressed in this manner have a particularly high tensile strength making this type of ware useful wherever high bending stresses or thermal shocks are to be encountered.

The following Table II sets forth the results obtained in a number of instances in which glasses of the various compositions listed in Table I have been subjected to various treatments using different heating and cooling media and methods. In each instance a strain pattern of the high ratio type was produced and the ratio of compression to tension was greater than 3.25.

Table II

| | Glass composition | | | | | |
|---|---|---|---|---|---|---|
| | A | A | A | A | A | A |
| Glass thickness | ¼" | 6 mm | 10.5 mm | ¼" | ¼" | ¼". |
| Heating temp | 800° | 850° | 800° | 800° | 775° | Pre. 630°. Flash 850°. |
| Heating time | 4 min | 3 min | 3 min | 5 min | 5 min | 5 min. 2 min. |
| Heating medium | Air | NaCl Na₂SO₄ | NaCl Na₂SO₄ | Air | Air | Air. |
| 1st chill temp | 175° | 250° | 160° | 160° | 90° | 145°. |
| 1st chill time | 5 sec. spray | 3 sec. spray | 3 sec. spray | 2 sec. spray | 1 sec. dip | 3 sec. dip   4 sec. dip |
| 1st chill medium | NaNO₂ KNO₃ | NaNO₂ KNO₃ | NaNO₂ KNO₃ | Urea | NaNO₃ KNO₃ 15% H₂O | NaNO₃ KNO₃ 10% H₂O. |
| 2nd chill temp | 450° | 360° | 360° | 350° | 335° | 400°   440° |
| 2nd chill time | 2 min | 1 min | 1 min | 20 sec | 40 sec | 40 sec. |
| 2nd chill medium | NaNO₂ KNO₃ | NaNO₂ KNO₃ | NaNO₂ KNO₃ | NaNO₃ KNO₃ | NaNO₂ KNO₃ | NaNO₃   NaNO₃ KNO₃   KNO₃ |
| Tension | 1.97 | 1.1 | 1.5 | 1.8 | 2.0 | 2.2   2.2 |
| Compression | 10.3 | 6.2 | 9.3 | 8.1 | 8.8 | 8.5   7.6 |
| Ratio C/T | 5.18 | 5.6 | 6.2 | 4.4 | 3.7 | 3.9   3.4 |

| | Glass composition | | | | |
|---|---|---|---|---|---|
| | B | C | D | E | F |
| Glass thickness | ¼" | ¼"   ¼" | ¼" | ½" | 1". |
| Heating temp | 750° | 700°   700° | 750° | Pre. 400° Air 600° 750° | Pre. 400°. Air 600°. 750° |
| Heating time | 3 min | 3 min.   3 min. | 1¼ min | 10 min. 7 min. 1 min. | 15 min. 10 min. 3 min. |
| Heating medium | NaCl Na₂SO₄ | KCl Na₂SO₄ | Na₂SO₄ NaCl | NaCl K₂SO₄ Na₂SO₄ | NaCl. K₂SO₄. Na₂SO₄. |
| 1st chill temp | 200° | 180°   180° | 320° | 250° | 300°. |
| 1st chill time | 2 sec. spray | 1 sec. spray   2½ sec. spray | 3 sec. spray   5 sec. spray | 10 sec. dip | 20 sec. dip. |
| 1st chill medium | NaNO₂ KNO₃ | NaNO₂ KNO₃ | NaNO₂ KNO₃ | NaNO₃ KNO₃ | NaNO₃. KNO₃. |
| 2nd chill temp | 350° | 390° | 380° | 425° | 450°. |
| 2nd chill time | 1 min | 40 sec | 30 sec | 3 min | 5 min. |
| 2nd chill medium | NaNO₂ KNO₃ | NaNO₂ KNO₃ | NaNO₂ KNO₃ | NaNO₃ KNO₃ | NaNO₃. KNO₃. |
| Tension | 2.7 | 1.2   1.3 | 2.1   2.0 | 2.0 | 2.0. |
| Compression | 15.3 | 4.1   5.2 | 10.1   8.4 | 8.3 | 7.9. |
| Ratio C/T | 5.6 | 3.5   3.9 | 4.8   4.2 | 4.1 | 3.9. |

From the foregoing it will be seen that regardless of the type of chilling medium employed, the necessary conditions for formation of a high ratio strain pattern include an initial severe chill for a period not exceeding five seconds per one-fourth inch of glass thickness to set up the surface layers only of the glass followed by a cooling down of the remainder of the article in a bath of higher temperature so that the cooling rate is less severe and a substantially uniform temperature gradient exists in each of the central layers of the article as they set up. After the article has reached the second bath temperature, which obviously must be below the strain temperature of the glass, the article may be chilled at any desired rate, without appreciably changing the strain pattern set therein, so either slow air cooling or quenching in hot water may be used, as convenient.

This application is a continuation-in-part of our copending application Serial No. 117,194, filed December 22, 1936.

We claim:

1. The method of tempering a glass article to produce a modified distribution of permanent stress therein which comprises heating the entire article to a temperature approaching the softening temperature of the glass from which the article is made, severely chilling the article to set the surface layers only in rigid condition by means of a chilling medium having a temperature substantially below the strain temperature of the glass and immediately immersing the article in a quenching bath maintained at a temperature higher than the temperature of the initial chilling medium but below the strain temperature of the glass until the entire article assumes this temperature and subsequently cooling the article to room temperature.

2. The method of tempering a glass article to produce a modified distribution of permanent stress therein which comprises heating the entire article to a temperature approaching the softening temperature of the glass from which the article is made, severely chilling the article for a period not exceeding five seconds per one-fourth inch of glass thickness by means of a chilling medium having a temperature substantially below the strain temperature of the glass to establish a high temperature gradient in the article and set the surface layers only in rigid condition and immediately setting up the remainder of the article while maintaining a lower, substantially uniform temperature gradient therein, by subjecting the article to a temperature lying between the temperature of the initial chilling medium and the strain temperature of the glass and subsequently cooling the article to room temperature.

3. The method of tempering a glass article to produce a modified distribution of permanent stress therein which includes heating the article to a temperature approaching the softening temperature of the glass from which the article is made, subjecting the article to a severe chilling medium having a temperature substantially below the strain temperature of the glass for a short time to create a sharp temperature gradient in the article and set the surface layers only rigidly against molecular movement, and immediately subjecting the article to a second less severe chilling medium for a time sufficient to lower the temperature of the entire article below the strain temperature of the glass from which it is made, said second chilling medium being held at a temperature close to the strain temperature of the glass, and subsequently cooling the article to room temperature.

4. The method of tempering a glass article to produce a modified distribution of permanent stress therein which comprises heating the article to a temperature approaching the softening temperature of the glass from which it is made, severely chilling the article to set the surface layers only in rigid condition by means of a chilling medium having a temperature substantially below the strain temperature of the glass and immediately immersing the entire article in a quenching bath maintained at a temperature above the temperature of the initial chilling medium and approximately 50° C. below the strain temperature of the glass of the article for a time sufficient to bring the entire body of the article to this temperature, and subsequently cooling the article to room temperature.

5. The method of tempering glass articles to produce a modified distribution of permanent stress therein which includes heating the articles to a temperature above the annealing temperature of the glass from which the articles are made, suddenly cooling the articles by subjecting them for a period of time not exceeding five seconds to a chilling medium held at a temperature well below the strain temperature of the glass from which the articles are made to set the surface layers only of said articles and immediately subjecting the articles for a somewhat longer period of time to a higher temperature substantially 50° C. below the strain temperature of the glass from which the articles are made to set up the remainder of the articles and subsequently cooling the articles to room temperature.

6. The method of tempering glass articles to produce a modified distribution of permanent stress therein which includes heating the articles to a temperature above the annealing temperature of the glass from which the articles are made, suddenly cooling the articles by subjecting them for a period of time not exceeding five seconds to a chilling medium held at a temperature at least 300° C. below the strain temperature of the glass from which the articles are made to set the surface layers only of said articles, and immediately subjecting the articles for a somewhat longer period of time to a higher temperature which is at least 50° C. below the strain temperature of the glass from which the articles are made to set up the remainder of the articles and subsequently cooling the articles to room temperature.

7. The method of tempering a glass article to produce a modified distribution of permanent stress therein which includes heating the article to a temperature above the annealing temperature of the glass from which it is made, suddenly cooling the article by subjecting it for a period of time not exceeding five seconds per one-fourth inch of glass thickness to a chilling medium held at least 100° C. below the strain temperature of the glass of the article to set up the surface layers only of said article and immediately subjecting the article for a period of at least twenty seconds to a chilling medium held at a higher temperature which is below the strain temperature of the glass from which the article is made to set up the remainder of the articles and subsequently cooling the articles to room temperature.

8. The method of tempering a glass article to produce a modified distribution of permanent stress therein which includes heating it to a temperature above the annealing temperature of the glass from which it is made, suddenly cooling the article by subjecting it for a period of time not exceeding five seconds per one-fourth inch of glass thickness to a chilling medium held at a temperature at least 200° C. below the strain temperature of the glass of the article to set up the surface layers only of said article and immediately subjecting it for a period of at least one minute to a higher temperature which is approximately 50° C. below the strain temperature of the glass from which the article is made to set up the remainder of the articles and subsequently cooling the articles to room temperature.

JESSE T. LITTLETON.
HOWARD R. LILLIE.
WILLIAM W. SHAVER.